Dec. 28, 1937.  R. LEE ET AL  2,103,589
MOTOR SPEED REGULATOR
Filed May 20, 1935
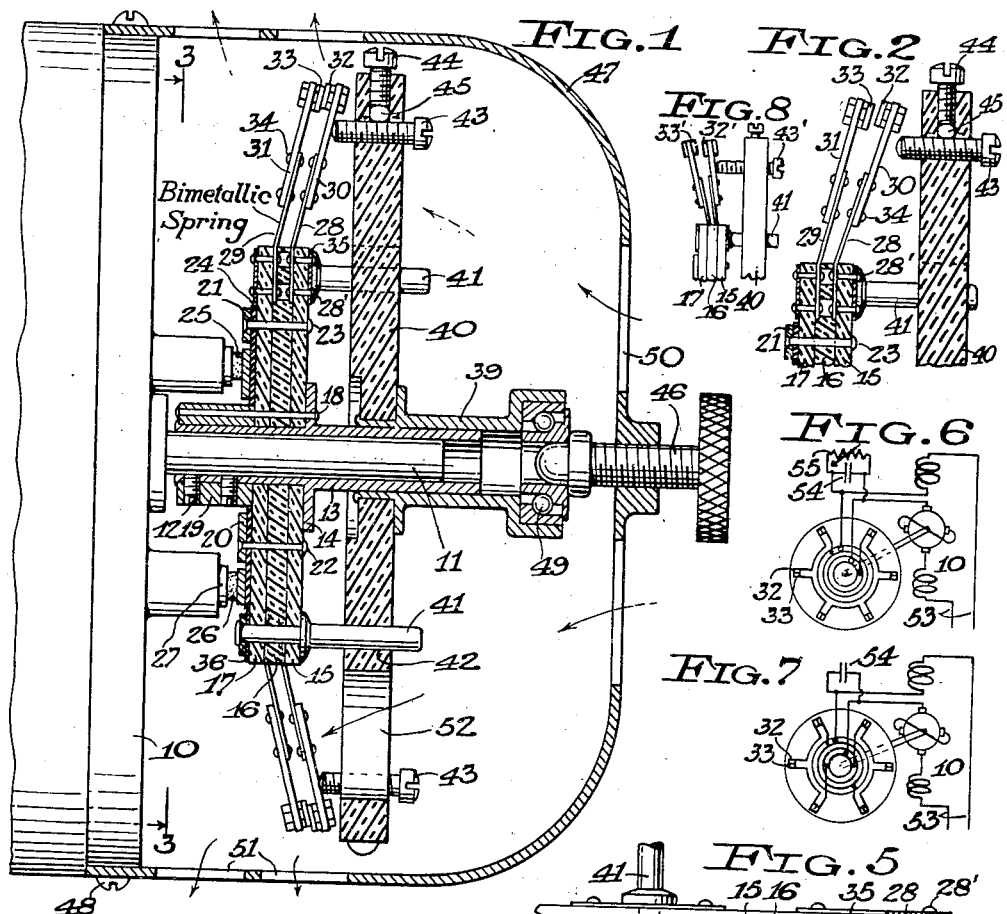
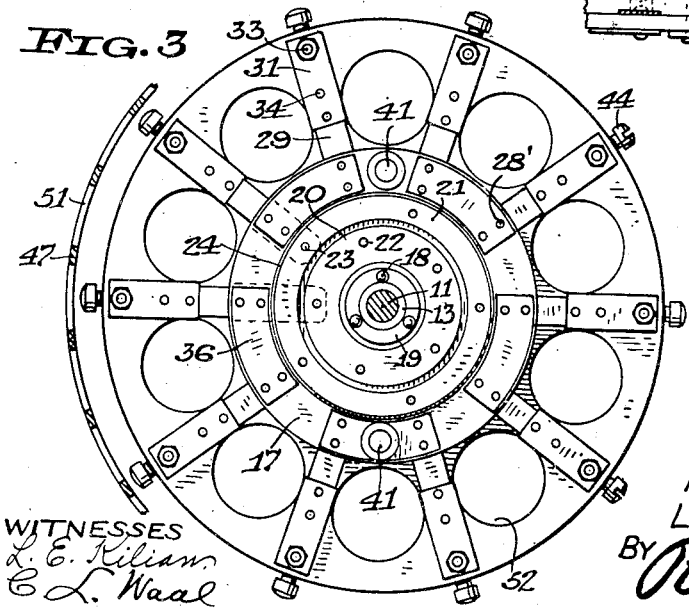
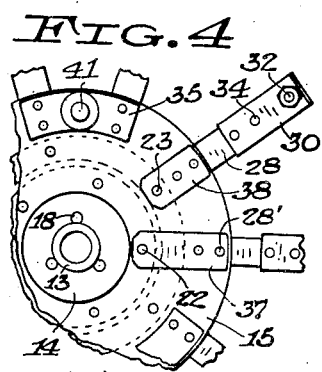
INVENTORS
ROYAL LEE AND
LAWRENCE E. EGEDAL
BY R. S. Caldwell
ATTORNEY
WITNESSES
L. E. Kilian
C. L. Waal Patented Dec. 28, 1937

2,103,589

UNITED STATES PATENT OFFICE 2,103,589

MOTOR SPEED REGULATOR

Royal Lee and Lawrence E. Egedal, Milwaukee, Wis., assignors to Lee Engineering Research Corporation, Milwaukee, Wis., a corporation of Wisconsin Application May 20, 1935, Serial No. 22,429

16 Claims. (Cl. 171—222)

The invention relates to regulating systems and more particularly to systems for regulating the speed of dynamo-electric machines and to speed-responsive switches for such systems.

An object of the invention is to provide a motor speed regulating system including a governor switch so constructed and arranged as to insure smooth motor operation and close speed regulation.

Another object of the invention is to provide a governor switch which will operate with little or no arcing, and which will have a long service life.

A further object of the invention is to provide a governor switch which is capable of current interruption at a relatively high frequency.

A still further object is to provide means for automatically preventing overheating of the governor switch contacts, and for automatically adjusting the speed-setting of a plurality of circuit-closers embodied in the governor switch.

The invention further consists in the several features hereinafter described and claimed.

In the accompanying drawing, illustrating certain embodiments of the invention,

Fig. 1 is an elevation, partly in section, of an electric motor having regulating or governing means constructed in accordance with the invention;

Fig. 2 is a sectional view showing the regulator or governor contacts out of engagement;

Fig. 3 is a sectional view taken on the line 3—3 of Fig. 1, the brushes being omitted;

Fig. 4 is a view of a rotatable contact carrier, parts being broken away;

Fig. 5 is a developed edge view of the contact carrier, parts being broken away and parts being shown in section;

Fig. 6 is a diagrammatic view of one form of regulator system;

Fig. 7 is a diagrammatic view of a modified form of regulator system, and

Fig. 8 is a view similar to Fig. 2, but showing a modified form of governor switch.

In the drawing, 10 designates a variable speed motor having a rotor shaft 11. In the present instance, the motor is indicated to be of an alternating current compensated repulsion type having series characteristics, although the invention is also applicable to direct current motors.

The rotor shaft has secured thereto, as by set screws 12, a tubular hub 13 having a surrounding flange 14. A set of three insulating disks 15, 16 and 17 are mounted on the hub 13 and are rigidly secured thereto by rivets 18 which clamp the disks between the flange 14 and a collar 19, an end of the hub 13 being preferably riveted over the end of the collar. The disk 17 has mounted thereon a pair of inner and outer slip rings 20 and 21 secured in place by rivets 22 and 23, respectively, passing through all the insulating disks. Preferably, the slip rings are underlaid by a sheet 24 of fibre or other suitable insulating material resisting carbonizing between the rings. Brushes 25 and 26 are mounted in suitable brush holders 27 in an end wall of the motor and bear against the slip rings.

A plurality of pairs of leaf springs 28 and 29 are mounted at their inner ends at the periphery of the insulating disks, the leaf springs 28 being secured by rivets 28' to the inner face of the disk 15, and the leaf springs 29 being similarly secured to the inner face of the disk 17. The intermediate disk 16 is between the springs and is suitably recessed to provide space for the springs and for the rivet heads. The springs, which are arranged in equally spaced pairs, are bent at their outer free portions to place them at an acute angle to the plane of the insulating disks, as seen in Figs. 1 and 2. The springs 28 are bent more than the springs 29 so that when the springs are at rest, and not stressed, each pair of springs will be divergent outwardly, as seen in Fig. 2.

At their outer portions, the springs 28 and 29 carry respective metal radiator plates 30 and 31 which in turn carry respective cooperating contacts 32 and 33. The radiator plates are secured to the springs by rivets 34 and the contacts are riveted or detachably secured to the radiator plates. The contacts are of any suitable material such as tungsten. Each pair of contacts forms a centrifugally operated circuit-closer, as hereinafter described.

The circuit-closers formed by the contacts are connected in series, the springs thereof being joined by metal plates 35 and 36 arranged alternately on the outer faces of the disks 15 and 17 and secured thereto by the rivets 28'. The contacts at the ends of the series are connected by metal straps 37 and 38 (Fig. 4) to the respective inner and outer slip rings 20 and 21, the straps being fastened by the spring-securing rivets 28' and by the slip ring rivets. The series connection of the circuit-closers is shown schematically in Fig. 6. Instead of a single series, the circuit-closers may be arranged in a plurality of series connected in parallel, as indicated in Fig. 7, wherein two series are shown.

Slidably mounted on an extended part of the tubular hub 13 is a sleeve 39 to the flanged end of which is rigidly secured an insulating disk 40. The contact-carrying rotor has riveted or otherwise secured thereto a pair of driving pins 41 extending parallel to the axis of rotation and slidably passing through openings 42 formed in the insulating disk 40 to prevent relative rotation between the latter disk and the contact-carrying rotor. Near its periphery the insulating disk 40 is provided with adjustable screws 43 which are engageable with the radiator plates 30. The screws are retained in position by locking screws 44 threaded radially into the disk 40 and engaging lead or other soft metal pellets 45 which in turn engage the screws 43.

The axial position of the insulating disk 40 is adjusted by a screw 46, such as a thumb screw, threaded through an end wall of a cup-shaped housing 47 secured to the motor as by screws 48. The thumb screw is axially aligned with the motor shaft and bears on an anti-friction thrust bearing 49 mounted in the enlarged end portion of the sleeve 39. The housing 47 is provided in its end wall with air inlet openings 50 and in its peripheral wall with air outlet openings 51 for the passage of cooling air currents which flow in the direction indicated by arrows under the fanning action of the rotating parts, the insulating disk 40 having a series of openings 52 through which the air flows. The substantially flat faces of the contacts and of the radiator plates are so located with respect to the axis of rotation as to facilitate the cooling action, these faces lying in planes substantially parallel or tangential to the path of rotary travel and at an acute angle to the radial plane, that is, a plane normal to the motor shaft. The adjustment of the thumb screw 46 serves to adjust the position of the contacts 32, so as to determine the speed of rotation at which the contacts 33 will separate from the contacts 32 under the action of centrifugal force, as hereinafter described. When the thumb screw is adjusted, the contacts have a wiping action. The supporting spring arms for each pair of engaged contacts are substantially parallel and relatively close together, and the effective lengths of these spring arms are substantially equal, so that the contact faces, when in engagement, will remain substantially parallel in all adjusted positions of the arms. The major component of movement of the spring arms and the contacts is in a direction parallel to the motor shaft.

The centrifugal switch means is suitably connected in circuit with the motor 10, and is here indicated to be connected in series with the motor. When so connected, it is preferably interposed between some of the motor windings, so as to minimize impulse disturbances on the line conductors 53. The brushes 25 and 26 are preferably bridged by some suitable spark or arc dissipating, absorbing, or suppressing device such as a condenser 54. If desired, a part of the motor current may be passed through an adjustable impedance 55 connected across the brushes.

In operation, current flows through the motor windings from the line conductors 53, all or a part of the motor current flowing by way of the brushes and slip rings through the several series-connected circuit-closers formed by the contacts 32 and 33, and the motor thereby being set in rotation. As soon as the motor reaches a predetermined speed, which is adjustable by the thumb screw 46, the contacts 33 separate from the contacts 32 under the influence of centrifugal force, thereby interrupting the motor current to prevent further rise in motor speed, and as the speed drops slightly the contacts again close to admit current to the motor, the cycle being then repeated. In practice, the contacts 33 vibrate at a high frequency which may range, for example, from 50 to 300 vibrations per second, so that the variation in motor speed is quite small and hunting is prevented. The arrangement of the spring-mounted contacts makes possible a wide range of speed adjustments, and permits efficient operation at high speeds, the outwardly projecting contact-weighted spring arms tending to move toward radial positions under urge of centrifugal force, and being placed under both longitudinal tension and transverse flexure by the action of centrifugal force.

If the contacts 33 are adjusted to open simultaneously, or in phase, then the voltage across each circuit-closer at the moment of break is quite small, with the result that little or no arcing occurs, and the contacts remain relatively cool under heavy current flow and will have a long life.

If the contacts 33 are adjusted to open successively, or out of phase, or at random, then the current interruptions are distributed between the contacts, and any incipient arcing at any set of contacts is quickly suppressed by the subsequent opening of one or more other sets of contacts, so that the contacts will remain in good condition and will have a long life. A particular advantage of the second-named adjustment is the smooth running of the motor at low speeds by reason of the considerably higher effective frequency of current interruption.

In practice, all the advantages of the two adjustments can be realized in the same device and at the same time if a sufficient number of contacts are provided so that some contacts will operate simultaneously and the others successively.

By screwing the thumb screw 46 inwardly, the motor will operate at a higher speed and outward movement of the thumb screw results in a lower motor speed. A further outward screwing of the thumb screw will separate the contacts 32 and 33, as seen in Fig. 2, and cause the motor to stop. The centrifugal switch will operate equally well when run in either direction, and at the same speed without resetting the thumb screw. The action of centrifugal force on the contacts 32 and their resilient supporting means is to reduce the pressure on the adjusting screws 43, thereby reducing the axial pressure on the thrust bearing 49.

In some instances, the leaf springs 29 (or the radiator plates 31) may be of bimetallic construction to provide a thermal control. If, for any reason, one of the contacts 33 should tend to overheat, the corresponding spring 29 will be heated above its normal temperature and will deflect in a direction to close the associated contacts 32 and 33, these contacts remaining closed until their temperature drops to normal, whereupon they will resume their normal operation.

While the centrifugal switch means is here shown to directly handle the motor current, it is possible to provide various schemes of indirect control, as, for example, in the manner shown in United States Letters Patent No. 1,979,890, for Motor controlling apparatus, issued November 6, 1934.

In the modified form of the centrifugal switch shown in Fig. 8, the contacts 32' and 33' of the several circuit-closers are arranged to close when the speed increases, the position of each contact 32' being adjusted by a screw 43' on the insulating disk 40. This type of switch can be used in cases where circuit-closing is desired upon increase of speed.

The thermostatic control of the circuit-closers not only serves to prevent overheating of the contacts, but also serves to insure operation of the circuit-closers at the same speed of rotation. For example, if one of the circuit-closers of the Fig. 1 device should start to vibrate at a motor speed slightly lower than that for which the others are set to operate, the heating of this circuit-closer will close its contacts, the motor speed will rise slightly, and then all the circuit-closers will vibrate to maintain the motor speed. The thermostatic effect can also be produced by selecting suitable metals for the springs 29 and radiator plates 31 riveted thereto. By way of illustration, steel springs and brass or duralumin radiator plates will provide the desired thermostatic effect.

In cases where the governor switch is mounted to rotate on a horizontal axis, or any axis at an angle to the vertical, the circuit-closers are subject to a gravitational effect in addition to the centrifugal effect, tending to operate each circuit-closer once every revolution at low motor speeds. However, because of the presence of a plurality of angularly spaced circuit-closers, a high effective frequency of circuit interruption is obtained and the motor will operate smoothly at low speeds notwithstanding the gravitational effect.

What we claim as new and desire to secure by Letters Patent is:

1. The combination, with an electric motor, of motor-speed-responsive switch means having a circuit connection with said motor to control the motor speed and having a plurality of speed-controlled series-connected circuit-closers operable at the same speed of rotation but at different instants to provide an effective frequency of circuit interruption higher than that of any one of said circuit-closers, whereby to obtain close speed regulation of the motor.

2. The combination, with an electric motor, of motor-speed-responsive switch means having a circuit connection with said motor to control the motor speed and having a plurality of series-connected vibratory circuit-closers operable at the same speed of rotation.

3. A speed-responsive switch having a plurality of series-connected circuit-closers, some of which are simultaneously operable and others of which are successively operable.

4. A speed-responsive switch having a plurality of series-connected circuit-closers arranged in series-parallel.

5. A speed-responsive switch having a plurality of circuit-closers, and temperature-responsive means for preventing operation of any one of said circuit-closers in an overheated condition.

6. In a centrifugal switch, the combination of a plurality of speed-responsive vibratory circuit-closers, and means for adjusting in unison the speed-setting of said circuit-closers.

7. In a centrifugal switch, the combination of rotatable means including a pair of coaxial rotatable members drivingly connected and relatively axially movable, a plurality of speed-responsive vibratory circuit-closers carried by said rotatable means, and means for varying the relative axial position of said rotatable members to adjust the speed-setting of said circuit-closers.

8. In a centrifugal switch, the combination of a rotatable member, a yieldably mounted contact carried by said member at a distance from the axis of rotation and displaceable by centrifugal force, a cooperating contact rotatable with said first-named contact to form a circuit-closer therewith, the faces of said contacts lying substantially in a plane tangent to their path of travel and approaching a radial plane, and means for conducting current to said contacts.

9. In a centrifugal switch, the combination of a rotatable member, a pair of springs secured to said member, contacts carried by said springs, said contacts being out of engagement when said springs are free of stress, one of said springs being deflectable by centrifugal force, means for adjusting the position of the other spring to determine the speed of rotation at which said contacts will separate, and means for conducting electric current to said contacts.

10. In a centrifugal switch, the combination of a rotatable member, a pair of contacts carried by said member at a distance from its axis of rotation and having a component of relative movement parallel to said axis, at least one of said contacts being displaceable by centrifugal force to form a circuit-closer with the other contact, and means for conducting electric current to said contacts.

11. A speed-responsive switch having a plurality of series-connected vibratory circuit-closers, and temperature-responsive means for automatically adjusting any one of said circuit-closers which tends to operate at a speed-setting different from that of the other circuit-closers.

12. In a centrifugal switch, the combination of rotatable means including a pair of coaxial rotatable members drivingly connected and relatively axially movable, a plurality of speed-responsive vibratory circuit-closers carried by one of said rotatable members, means carried by the other rotatable member for individually adjusting said circuit-closers, and means for varying the relative axial position of said rotatable members to adjust the speed-setting of said circuit-closers.

13. A speed-responsive switch having a plurality of circuit-closers with vibratory elements, and automatic means for adjusting any one of said circuit-closers which tends to operate at a speed-setting different from that of the other circuit-closers.

14. In a centrifugal switch, the combination of rotatable means, a pair of spring arms secured to said means and projecting outwardly at an angle to a plane normal to the axis of rotation of said means, said spring arms having a major component of deflection parallel to the axis of said rotatable means, cooperating contacts carried by said spring arms at a distance from the axis of rotation, one of said contact-carrying spring arms being displaceable by centrifugal force to form a circuit-closer with the other contact-carrying spring arm, means for conducting electric current to said contacts, and means operable during the rotation of said rotatable means for adjusting the other spring arm to vary the speed-setting of the circuit-closer.

15. In a centrifugal switch, the combination of a rotatable member having a spring arm with a major component of flexural movement in a direction substantially parallel to the axis of rotation of said member, a pair of contacts carried by said rotatable member at a distance from said axis and having a major component of relative movement parallel to said axis, one of said contacts being carried by said spring arm and displaceable by centrifugal action on said arm to form a circuit-closer with the other contact, means for conducting electric current to said contacts, and means operable during the rotation of said rotatable member for adjusting the speed-setting of said circuit-closer.

16. In a centrifugal switch, the combination of a rotatable means including a pair of coaxial rotatable members drivingly connected and relatively axially movable, a pair of circuit-closer contacts carried by said rotatable means, said rotatable means having a spring arm with a major component of flexural movement in a direction substantially parallel to the axis of rotation of said rotatable means, one of said contacts being carried by said spring arm at a distance from the axis of rotation and displaceable by centrifugal action with respect to the other contact, the contact on said spring arm having a major component of movement parallel to the axis of rotation, means for conducting electric current to said contacts, and means for varying the relative axial movement of said rotatable members to adjust the speed-setting of the circuit-closer.

ROYAL LEE.
LAWRENCE E. EGEDAL.